United States Patent [19]
Beran et al.

[11] Patent Number: 5,210,406
[45] Date of Patent: May 11, 1993

[54] PRESENCE DETECTOR HOUSING AND MOUNT

[76] Inventors: Mark A. Beran, P.O. Box 71, Niwot, Colo. 80544; Farro Fattahi, 4730 Park Granada, #226, Calabasas, Calif. 91302

[21] Appl. No.: 712,585

[22] Filed: Jun. 10, 1991

[51] Int. Cl.[5] .............................................. G01V 9/04
[52] U.S. Cl. ..................................... 250/221; 250/239
[58] Field of Search ................... 250/221, 222.1, 216, 250/239, 214 AL; 340/555, 556, 557

[56] References Cited
U.S. PATENT DOCUMENTS

| | | | |
|---|---|---|---|
| 4,837,430 | 6/1989 | Hasegawa | 250/222.1 |
| 4,894,527 | 1/1990 | Smith | 250/214 AL |
| 4,912,316 | 3/1990 | Yamakawa | 250/221 |
| 4,973,837 | 11/1990 | Bradbeer | 340/556 |
| 5,008,529 | 4/1991 | Nakamura | 250/221 |

Primary Examiner—David C. Nelms
Attorney, Agent, or Firm—Harold A. Burdick

[57] ABSTRACT

Presence detecting apparatus and housing and mounts therefore are disclosed, the apparatus including control circuitry, an emitter array, detector array, and background compensation sensor mounted and housed to provide a safe and effective detection area characterized by substantially constant detection sensitivity over the defined detection area while avoiding undesired detection of objects present outside the detection area. The emitter array and detector array are mounted and housed so that the detector array is substantially isolated from transmission in the housing of selected electromagnetic signals from the emitter array.

19 Claims, 8 Drawing Sheets

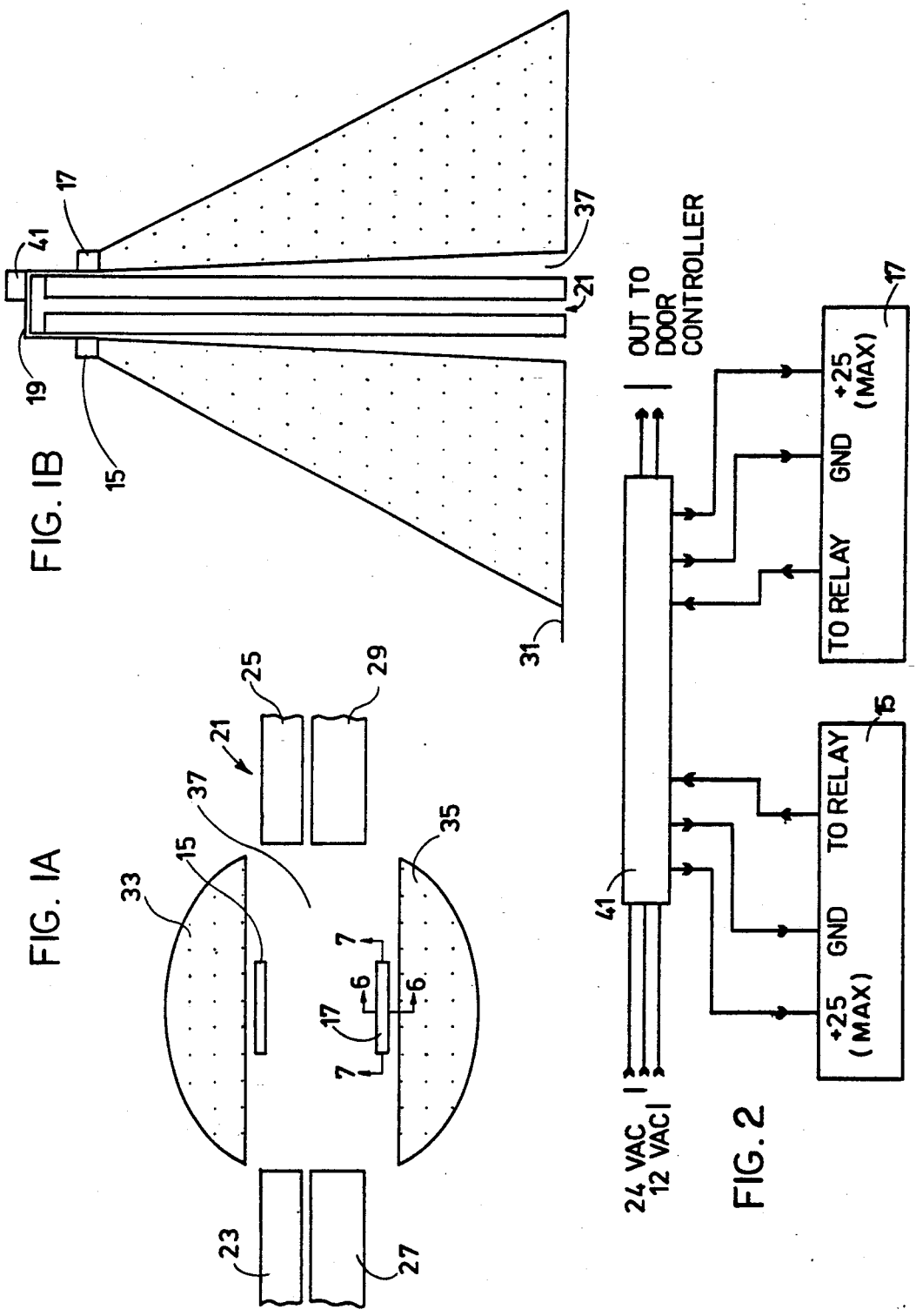

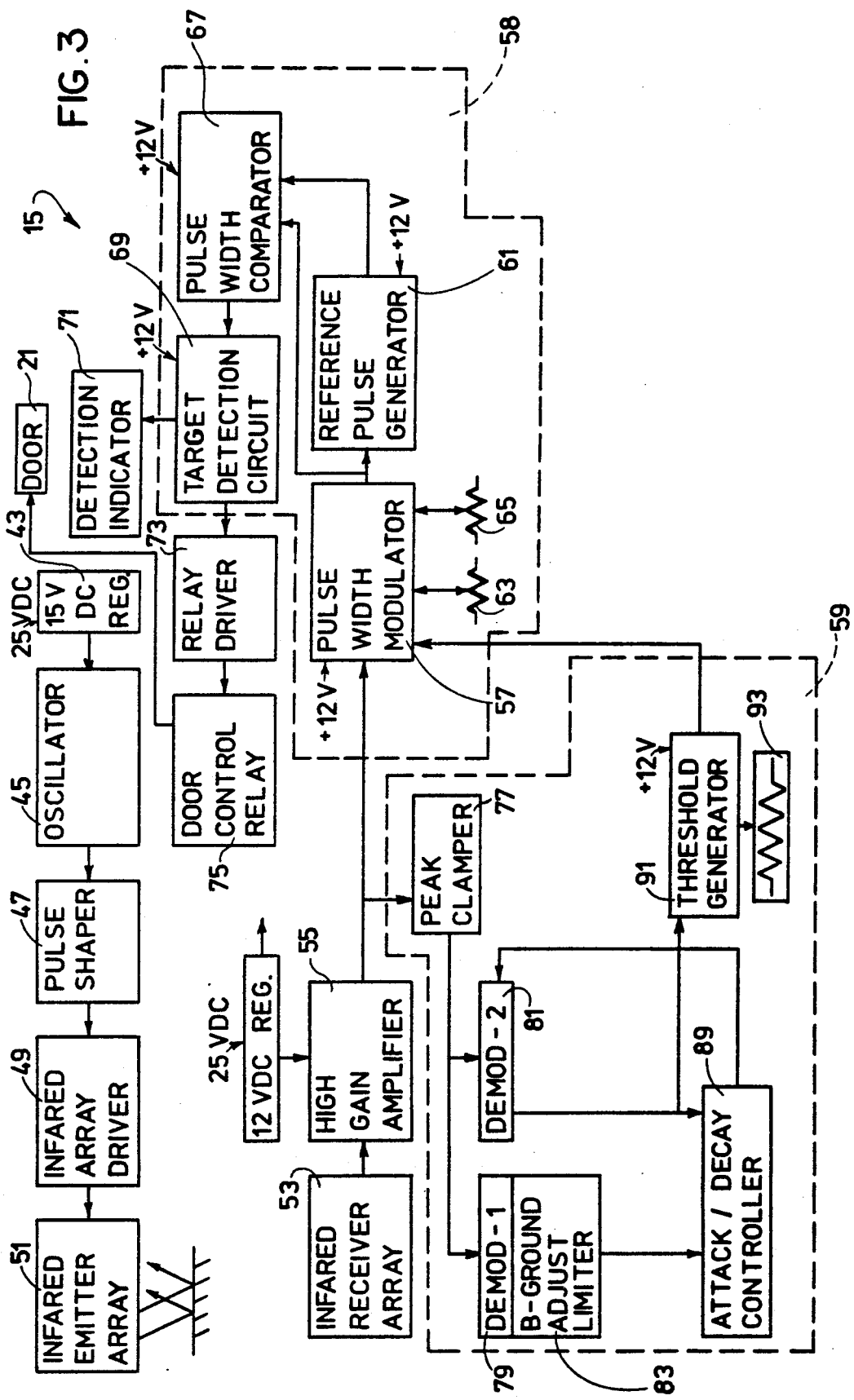

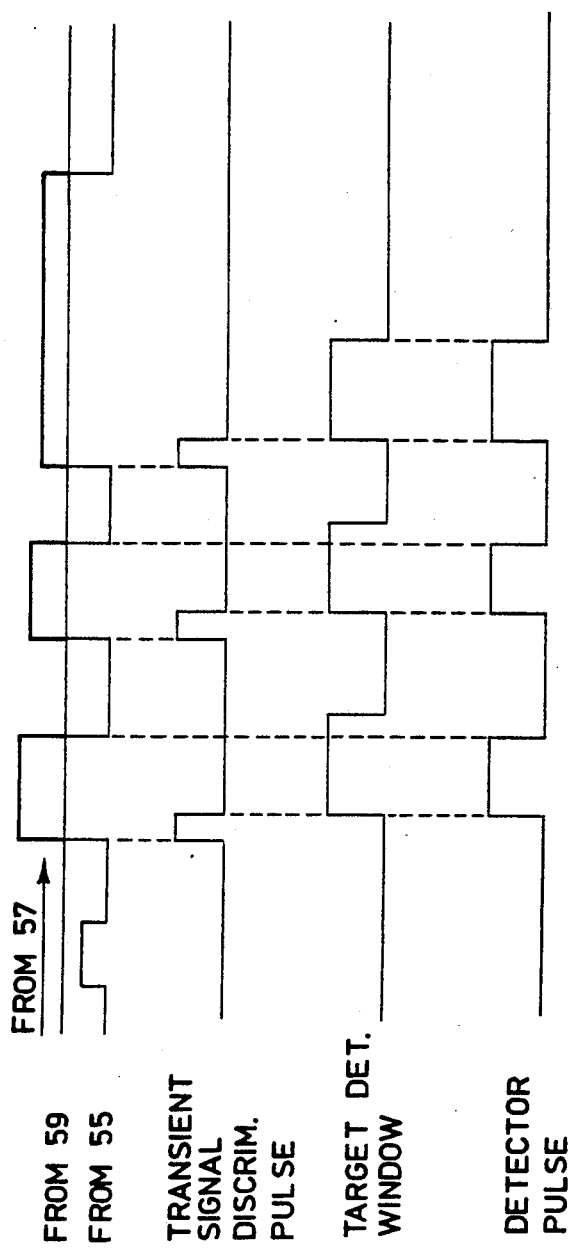
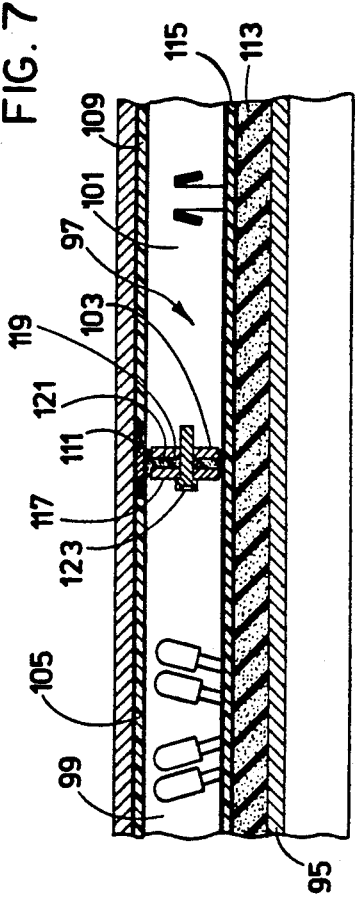

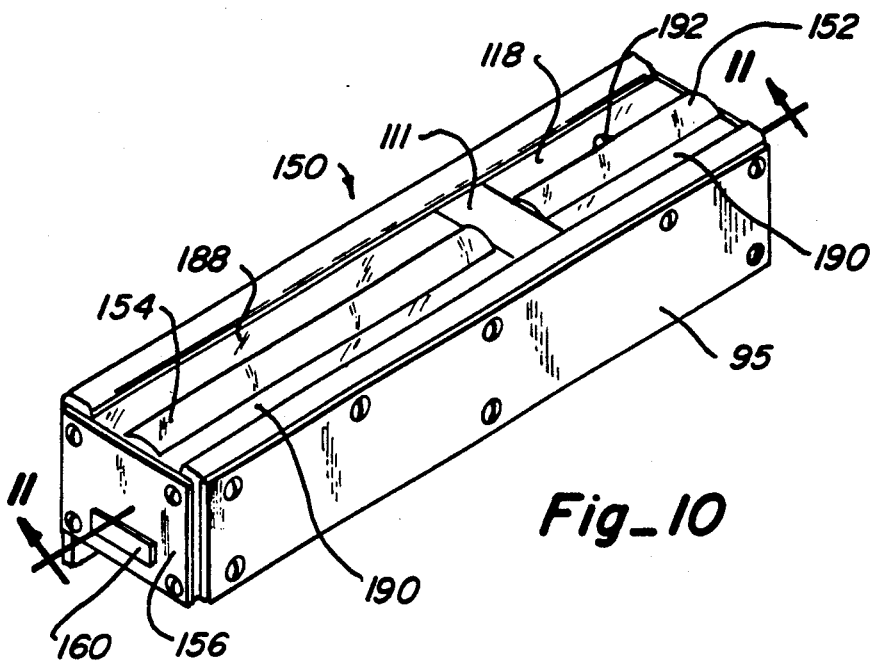
Fig_10
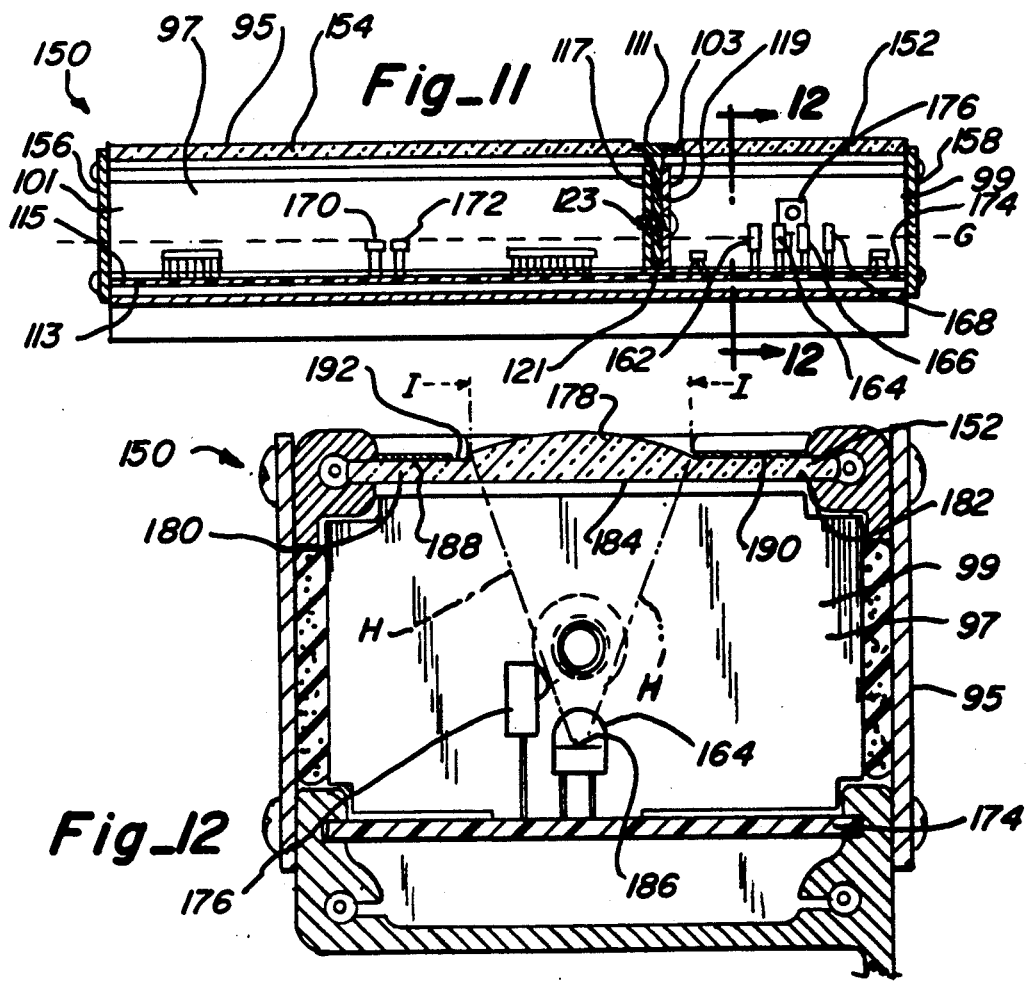
Fig_11
Fig_12

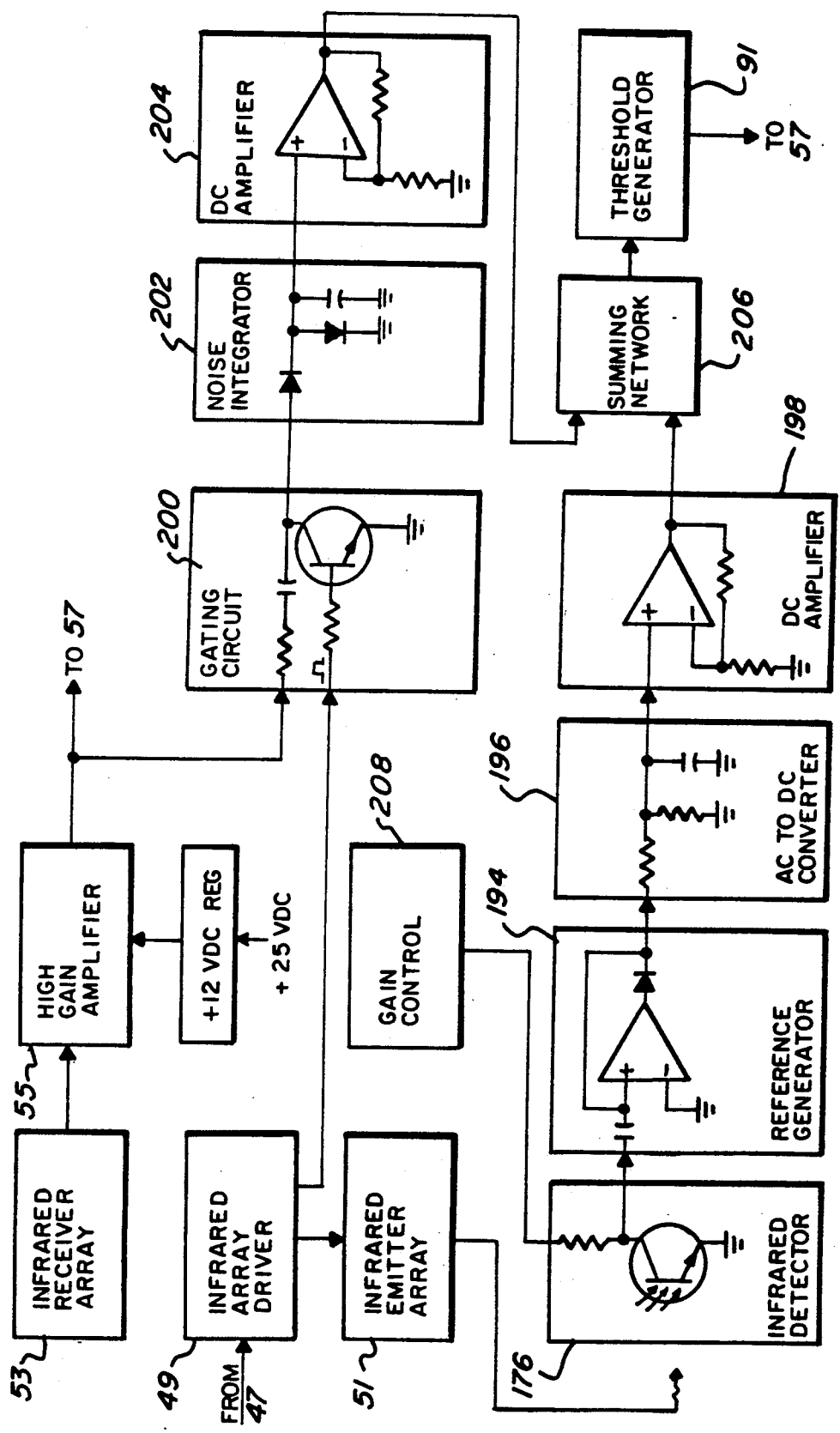
Fig_14

PRESENCE DETECTOR HOUSING AND MOUNT

FIELD OF THE INVENTION

This invention relates to presence detecting apparatus, and, more particularly, relates to presence detecting apparatus for automatic doors.

BACKGROUND OF THE INVENTION

Presence detecting devices, including such devices for automatic doors, have been heretofore known and/or utilized wherein a plurality of infrared emitters and receivers are utilized to provide a detection area, for example in a security area or at the threshold of the automatically actuated door (see for example U.S. Pat. Nos. 4,179,691, 4,823,010, 4,733,081, 4,697,383, 4,669,218, 4,565,029, and 4,698,937). In general, such devices have utilized single clock synchronization of infrared emitters to project a beam of energy in a detection area and receivers together with detector circuitry to receive reflected energy and send an operational signal when a target is detected at or near the threshold of a door.

Various arrangements to compensate for variations in environmental factors in the detection area to minimize the number of malfunctions, or detection errors, are also known and/or have been utilized (see, for example, U.S. Pat. Nos 4,929,833, 4,570,157, and 4,119,843). Such arrangements include manual threshold sensitivity adjustments (see for example U.S. Pat. No. 4,823,010) and/or utilization of elaborate and expensive multiple integration circuits (see for example U.S. Pat. No. 4,733,081, wherein the rate of change, or variation, of signal is utilized to discriminate a human body from the background signal received by a detector).

While, in some cases, heretofore known devices have employed means to prevent systematic detection errors, such as the door itself being operationally treated as a target (for example by turning off the sensor or eliminating sensor signal response during door operation), or malfunction or error caused by in housing light transmission, such devices have not proven entirely successful in eliminating such malfunction or false triggers, for example resulting in opening of a door where no body, such as a human body, shopping cart or the like, is present, or failure to open when a body is present.

It would thus be desirable to provide a simple and inexpensive presence detecting apparatus which includes automatic adjustment of the sensitivity of such an apparatus to compensate for changes in the environment in a detection area (such as snowfall, rain, daylight and darkness), while providing means for ignoring systematic occurrences, such as door movement, light transmission inside of the apparatus housing, and the like, and/or random and short lived transient occurrences. Further improvement in such heretofore known devices and methods could thus still be utilized.

SUMMARY OF THE INVENTION

This invention provides a presence detecting apparatus housing and mount for an apparatus including an emitter for emitting signals to a detection area and a receiver for receiving at least some of the signals reflected from surfaces present in the detection area. The apparatus preferably further includes a background compensation network for automatically adjusting detection sensitivity of the apparatus to compensate for variations in background conditions in the detection area, and discriminating circuitry connected with the receiver and the background compensation network for discriminating when reflected signals received by the receiver are indicative of a body (such as a human body or other object moving into the detection area) and for providing a detection output responsive thereto.

The emitter and receiver are positioned, oriented and shielded in the housing and mount to provide an effective detection area, the emitter and receiver being housed in separate compartments of a housing chamber with the compartments being separated by an improved isolating device having a deformable barrier for dividing and sealing the compartments against leakage of electromagnetic radiation between the compartments or laterally through the lens, or filter, through which the selected electromagnetic radiation is emitted to, and received from, the detection area. In one embodiment of the invention the lens redirects the electromagnetic radiation emitted and/or received, collimating light emitted and/or focussing light received by the emitter and receiver, respectively.

A detecting element, associated with the background compensation network, is mounted in the housing in a selected spaced relationship to the emitter and the lens to thus improve and vastly simplify performance of adjustments in detection sensitivity threshold of the apparatus by the background compensation network to accommodate for changing ambient light conditions and/or emitter performance.

It is therefore an object of this invention to provide an improved housing and mount for presence detecting apparatus.

It is another object of this invention to provide a housing and mount for presence detecting apparatus that is configured to aid, in cooperation with the apparatus, definition of a detection area and minimization of detection errors.

It is still another object of the invention to minimize detection error caused by door movement without altering sensor operation.

It is still another object of this invention to provide a housing and mount for presence detecting apparatus having means for directing electromagnetic radiation emitted by the apparatus.

It is another object of this invention to provide a housing and mount for presence detecting apparatus configured for improvement and simplification of a network for automatic variation of the detection sensitivity threshold of the apparatus.

It is yet another object of this invention to provide a housing apparatus for a presence detector including a mounting structure which in part defines a chamber for mounting the presence detector therein, a filter, or lens, mountable at one part of the mounting structure and having first and second portions, a chamber divider for dividing the chamber into first and second compartments and substantially sealing the first compartment from the second compartment of the chamber against passage of selected electromagnetic radiation therebetween, and a bridge mountable at one part of the mounting structure and which is made of material substantially opaque to the selected electromagnetic radiation, the bridge engaging the first and second portions of the filter and a part of the chamber divider.

It is still another object of this invention to provide a chamber divider for dividing a chamber having chamber walls into first and second compartments, at least one of the compartments for housing a component capable of emitting selected electromagnetic radiation, the divider including a deformable barrier, upon compression of a first part of which a second part is urged toward the chamber walls to divide the chamber and substantially seal the compartments from passage therebetween of the selected electromagnetic radiation.

It is another object of this invention to provide a housing and mount for presence detecting apparatus used with automatic doors wherein emitters and/or receivers are positioned, oriented and shielded in a housing to provide a physical detection area spaced from the threshold of a doorway so that the door is not detected by the apparatus.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIGS. 1A and 1B are diagrammatic illustrations depicting positioning of the apparatus and housing of this invention adjacent to a sliding door and illustrating the detection area provided by a first embodiment of the apparatus at the doorway;

FIG. 2 is a block diagram illustrating the presence detecting apparatus in a door control system;

FIG. 3 is a more detailed block diagram illustrating a first embodiment of the presence detecting apparatus;

FIG. 5 is an illustration of the transient signal discrimination pulse and target detection window pulse generated by the apparatus and to which a pulse width modulated signal containing target detection information is compared;

FIG. 6 is a sectional view of a first embodiment of the apparatus housing and mount of this invention taken through section line 6—6 of FIG. 1A;

FIG. 7 is a sectional view taken through section line 7—7 of FIG. 1A illustrating the housing and mounting arrangement of the first embodiment of this invention;

FIG. 10 is a perspective view of a second, and now preferred, embodiment of the apparatus housing and mount of this invention;

FIG. 11 is a sectional view taken through section line 11—11 of FIG. 10;

FIG. 12 is a sectional view taken through section line 12—12 of FIG. 11;

FIG. 14 is a block diagram illustrating a third embodiment of the detecting apparatus.

DESCRIPTION OF THE INVENTION

Figure 4:
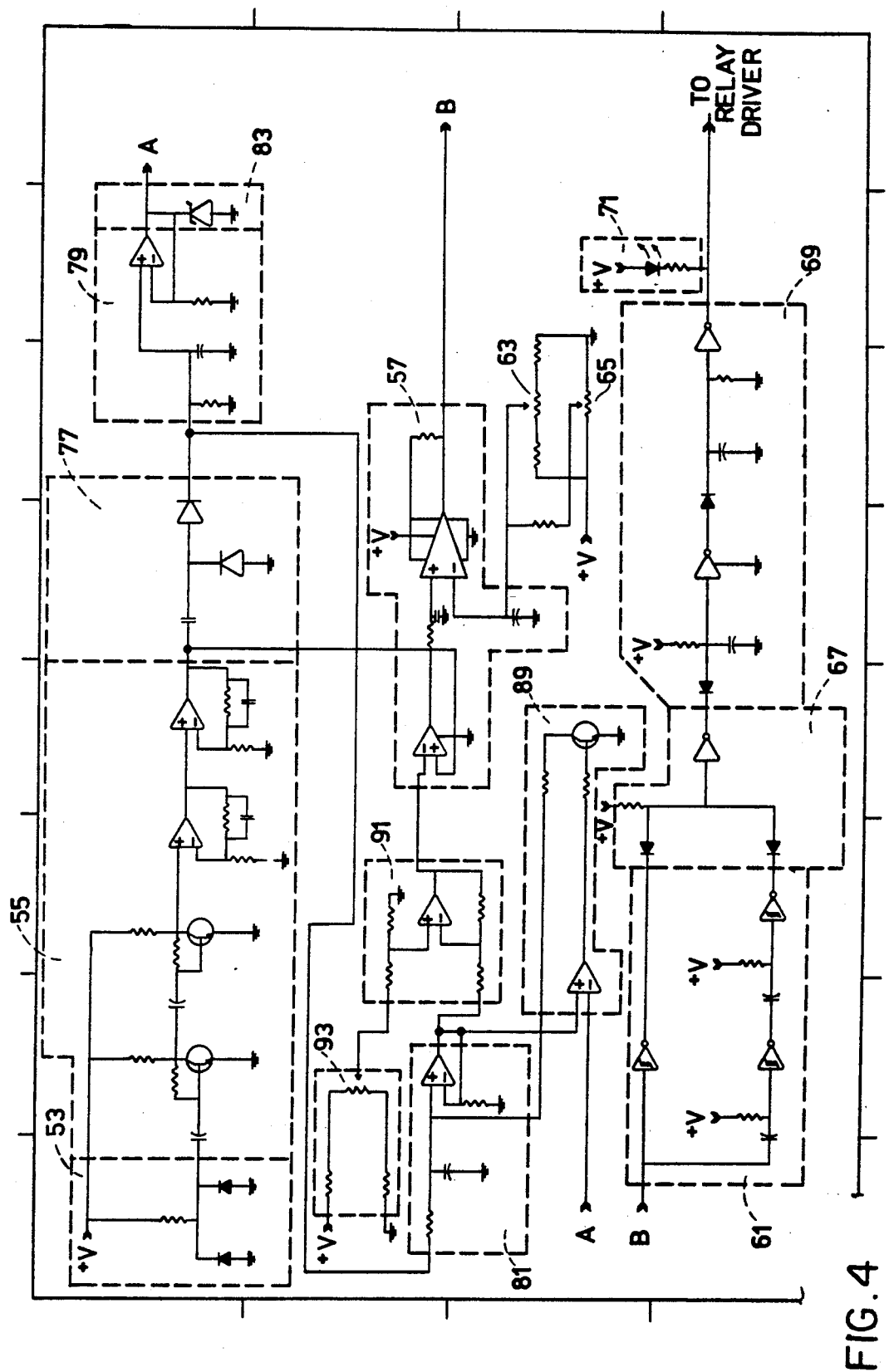
FIG. 4 is a schematic illustration of the receiver, background compensation network, and discriminating circuitry of the apparatus of FIG. 3.

Apparatus 15 and 17, including the housing and mount of this invention, are illustrated in FIGS. 1A and 1B mounted to sliding door transom member 19 adjacent to sliding door assembly 21 including stationary door members 23 and 25 and sliding door members 27 and 29. Such apparatus are typically mounted at a standard height (for example from 84 to 90 inches above floor 31).

As will be further developed herein with regard to a first embodiment of the apparatus, the emitter array and receiver array of apparatus 15 and 17 each cooperate to effectively define a detection area characterized by a truncated elliptical effective detection zone, or footprint, 33 and 35 at each side of threshold 37 of the doorway, each active footprint measuring, for example, roughly 15 to 30 inches (from the center of the flat, or truncated, edge of the ellipse to the furthermost portion of the ellipse away from the door) by about 72 to 96 inches (along the truncated edge and coinciding with the approximate size of the largest door opening). By providing an active detection area of this general configuration at each side of the doorway threshold, the problem of false triggers due to movement of the doorway through the active detection area is substantially eliminated.

As illustrated in FIG. 2, apparatus 15 and 17 are connected with power supply and driver unit 41 (which may be mounted anywhere adjacent to the door, for example adjacent to transom unit 19) for providing a 25 volt DC power signal to each of the apparatus and for receiving the actuating output signal from the apparatus to relay circuits therein to thus actuate a door opening and closing controller.

FIGS. 3 and 4 illustrate a first embodiment of an apparatus housed and mounted in the housing and mount of this invention in more detail (it being understood that apparatus 15 and 17 are substantially identically configured). The 25 volt (maximum) DC power supply received from supply and driver unit 41 is regulated at regulator 43 for thus providing a 15 volt DC signal to solid state oscillator 45, oscillator 45 providing the primary time base used for modulation of the emitted infrared signals. The output from oscillator 45 is received at pulse shaper stage 47 for controlling the duty cycle of the signal received at infrared array driver unit 49. Driver 49 activates the emitter array substantially synchronously and continuously (the four emitter LEDs, illustrated in FIGS. 8A and 8B, being driven in series) for a predetermined period, or duty cycle, at a repetition rate controlled by the modulation frequency of solid state oscillator 45 (for example a signal having a modulation frequency from about 1 to 5 kHz with approximately a 10% duty cycle).

Emitter array 51 consists of a multiplicity of infrared emitter diodes. In one embodiment of the apparatus, the diodes are mounted for different angles of radiation and are oriented in a specific pattern, as more fully set forth hereinafter, to maximize uniform radiation intensity within the desired detection area. Selected electromagnetic radiation from emitter array 51 is reflected from surfaces in the detection area, at least some of the scattered electromagnetic signals being received by infrared receiver array 53. Receiver array 53 includes a plurality of infrared energy detectors mounted at specific detection angles to receive the scattered infrared energy reflected from surfaces, including objects and/or bodies moving into the detection area as well as structural surfaces (for example floor 31). In one embodiment of the apparatus, the mounting angles and the location of the receiver array are optimized to match the emission pattern of the emitter array and provide for optimum detection of persons and objects within the designated detection area.

The modulated, scattered infrared energy received by receiver array 53 is amplified by high gain amplifier stage 55 to provide a useful level of modulated signal, the amplitude variations therein being dependent on the amount of reflected infrared energy received at receiver array 53. High gain amplifier stage 55 also provides a certain degree of filtration against unmodulated optical interference detected by receiver array 53. In the absence of any body, such as a person or object, which is moved within the detection area, the amount of reflected infrared radiation received is dependent only on the ambient conditions in the detection area and is constant with the exception of small variations caused by changes in environmental factors (such as temperature conditions, time of day or night, and the condition of floor 31, for example whether wet, dry, snow covered or the like). When a person or object of sufficient cross section enters the detection area, the amount of scattered radiation received at the receiver is increased, causing a corresponding increase in the output of high gain amplifier stage 55.

The modulated output of amplifier stage 55 provides the required clock input for pulse width modulator circuit 57 and furnishes the necessary input to background compensation network 59 described in more detail hereinafter. The output from background compensation network 59 is a variable detection threshold signal which provides the modulation input to pulse width modulator circuitry 57 of discriminating circuitry 58. Utilizing the detection threshold sensitivity information provided by the output signal from background compensation network 59, pulse width modulator 57 generates a pulse train, the width of each pulse being proportional to the amount of scattered infrared energy received by receiver array 53. The pulses generated by pulse width modulator circuitry 57 also provide the synchronization signal for reference pulse generator 61, thereby providing synchronization of the overall discrimination circuitry 58 independently from synchronization of the infrared emitter stage provided by oscillator 45 so that asynchronous operation thereof is achievable.

Each pulse from pulse width modulator circuitry 57 initiates generation of two consecutive pulses from reference pulse generator 61, the first, transient signal discrimination pulse, having a width adjustable by coarse and fine adjustment potentiometers 63 and 65 (for example in a range between 1 and 10 microseconds), providing the first stage of a two stage transient signal detector, and the second pulse providing a target detection window.

As logically illustrated in FIG. 5, the pulse width modulated signal containing target detection information from pulse width modulator 57 is compared with the two pulses generated by reference pulse generator 61 at pulse width comparator stage 67. If the output pulse of pulse width modulator circuitry 57 containing the target information is sufficiently long to exceed the transient signal discrimination pulse (for example having a pulse duration of 10 microseconds) and continues through the target detection window pulse (for example having a pulse duration of 20 microseconds and occurring after the transient signal pulse), a detector pulse proportional to the overlap duration of the output pulse and the target detection window pulse is generated and passed to target detection circuit 69.

Target detection circuit 69 contains the second stage of the transient signal detector and provides an actuating output only when a sufficient number of detection output pulses within a predetermined time period (for example at least 10 pulses in 5 milliseconds) is received from pulse width comparator 67. Upon receipt of the selected number of pulses, a true target (the presence of a body in the detection area) is indicated at LED 71 and an actuating output signal activates relay driver circuit 73 which in turn activates door control relay 75 (a normally open or normally closed dry contact) for activation of appropriate opening and closing circuits of automatic door 21.

Returning now to background compensation network 59, the output signal from high gain amplifier 55 is first referenced to ground at peak clamper 77 and provided at first and second demodulators 79 and 81. Demodulator circuit 79 has a short demodulation time constant (for example 20 to 50 milliseconds), while demodulator 81 has a longer demodulation time constant (for example 1 to 5 minutes), both demodulators being provided for demodulation of the reflected, modulated signal as represented at the output of peak clamper 77. The outputs of the demodulators are DC signals proportional to the level of received modulated signal.

Demodulator 79 provides the minimum and maximum boundaries for the variations in the output level of demodulator circuit 81. Demodulator 79 has limiter circuitry 83 associated therewith to limit the variations in the output DC level to those normally caused by changes in environmental factors (i.e., not including bodies moving within the detection area). The output signals from demodulators 79 and 81 are provided to attack/decay controller 89, the output from which is provided to demodulator 81 to provide a fast discharge path and hence asymmetric response of background compensation.

The DC output variations of demodulator 81, subject to the limiting and boundary constraints imposed by demodulator 79, are algebraically summed at threshold generator 91 with a preset threshold level (normally set for maximum sensitivity under normal environmental conditions) adjusted by potentiometer 93. For example, when the sun moves behind a cloud the input signal to demodulators 79 and 81 decreases, rapidly responsive to which the output signal from reference generator 91 will be automatically increased to maintain the desired sensitivity threshold level in the detection area. When the sun emerges from behind the cloud and the input to the demodulators increases, the output signal from the reference generator decreases, however much more slowly, to again achieve the desired sensitivity threshold. The result is a DC output from threshold generator 91 which provides a variable detection threshold sensitivity that will maintain substantially constant sensitivity of the apparatus by automatically adjusting for variations in background information received at receiver array 53 due to environmental factors experienced in the detection area.

By providing demodulator circuits with different demodulation time constants, an asymmetric response to the variations experienced is provided so that environmental factors which, without automatic adjustment, would result in an increase in sensitivity of the detection circuitry (for example a snow or rain covered floor) are controlled by the demodulator having the longer demodulation time constant and hence slowly effect variations in the detection sensitivity threshold (a safety consideration where, for example, a person stands for a long period in the doorway). On the other hand, changes in the background conditions that would, in the absence of automatic adjustment, tend to decrease sensitivity of the detection circuitry (for example night fall, the sun passing behind a cloud, or evaporation of rainwater on the floor) are controlled by the demodulator having the shorter demodulation time constant (demodulator 79) and are therefore compensated for substantially instantaneously resulting in an increased detection sensitivity.

Turning now to FIGS. 6 and 7, a first embodiment of the housing and mount of this invention is illustrated, the housing and mount providing improved, and less expensive, means of manufacturing a housing which substantially electromagnetically isolates the emitter array from the receiver array (for the prevention of false triggers and the like). Housing 95 provides chamber 97 therein for housing of the circuitry. Chamber 97 is divided into separate compartments 99 and 101 by divider 103 configured for substantially selectively electromagnetically isolating compartment 99 from compartment 101. Filters, or lenses, 105 and 109 cover the opening to chamber 97 and are engaged with substantially opaque bridge 111 (made, for example, of aluminum or other substantially non-transparent material capable of blocking light transmission), for isolating the two filters against movement of selected (usually infrared) electromagnetic radiation along the fibers of the filter between the two chambers.

Foam barrier 113 is provided at the bottom portion of housing 95 and below circuit mounting board 115. Divider 103 includes wall portions 117 and 119 on each side of compressible foam barrier 121 (for example made of the trademarked product "Poron") which, when urged toward one another by adjustment screw 123, compresses a part of barrier 121 to thus fill gaps around wall portions 117 and 119. The part of compressible barrier 121 extending beyond the edges of the wall portions is deformed by compression at the central part of barrier 121, thus urging the barrier thereat into contact with bridge 111 the walls of housing 95 and circuit board 115 to provide substantial selected electromagnetic signal sealing between chambers 99 and 101. Wall portions 117 and 119 each have a surface area smaller than the area of the surface of foam barrier 121 which they contact and smaller than a cross sectional area of chamber 97 to thus accommodate ease of installation and positioning of divider 103.

Figure 8A:
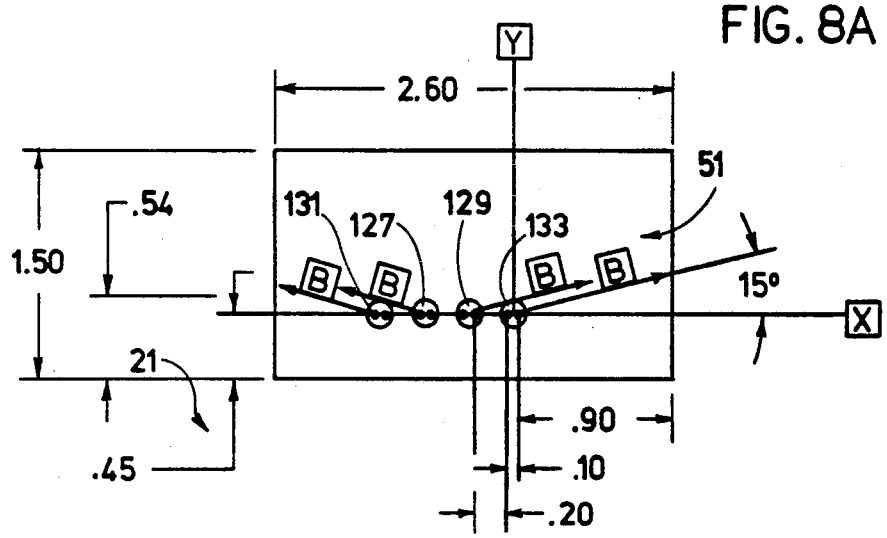
FIGS. 8A and 8B are diagrammatic illustrations of the positioning and orientation of the emitter array of the first embodiment of this invention.
Figure 8B:
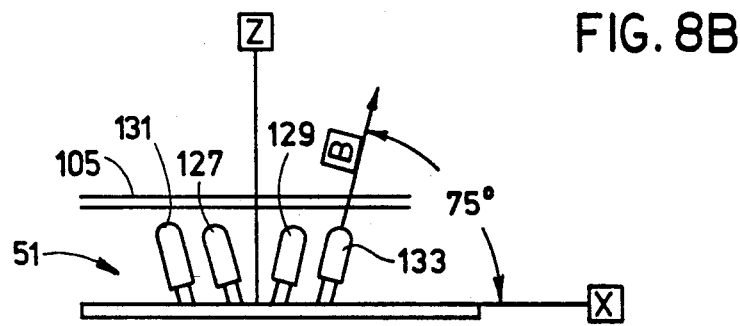
Figure 9A:
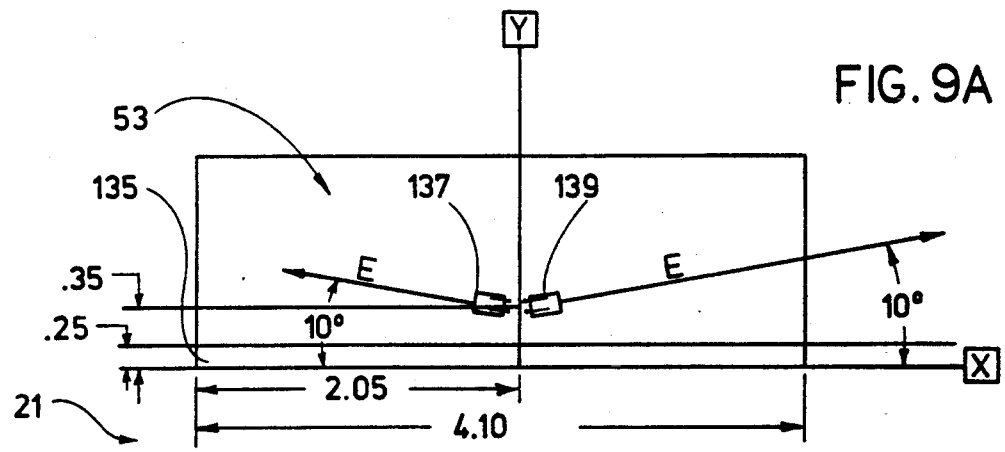
FIGS. 9A and 9B are diagrammatic illustrations of the positioning, orientation and shielding of the receiver array of the first embodiment of this invention.

FIGS. 8A, 8B, 9A and 9B illustrate the configuration, orientation, and shielding of detector array 51 and receiver array 53 provided to optimize radiation intensity within the detection area and to match the emission pattern of the emitter array with the receiver array for more optimal detection. FIGS. 8A and 9A illustrate the arrays as if one were standing beneath the apparatus looking through filters, or lenses, 105 and 109, the lines designated B and E representing the center line, or axis, of emission and detection of signals, respectively.

Emitters 127, 129, 131 and 133 are positioned linearly with the emitters being oriented so that the axis of emission for all emitters is up to approximately 15 degrees from the plan of motion of door 21. FIG. 8B illustrates orientation of emitters 127 through 133, the emission axis for each of the emitters being set at approximately 75 degrees from their mounting plane (x axis).

Figure 9B:
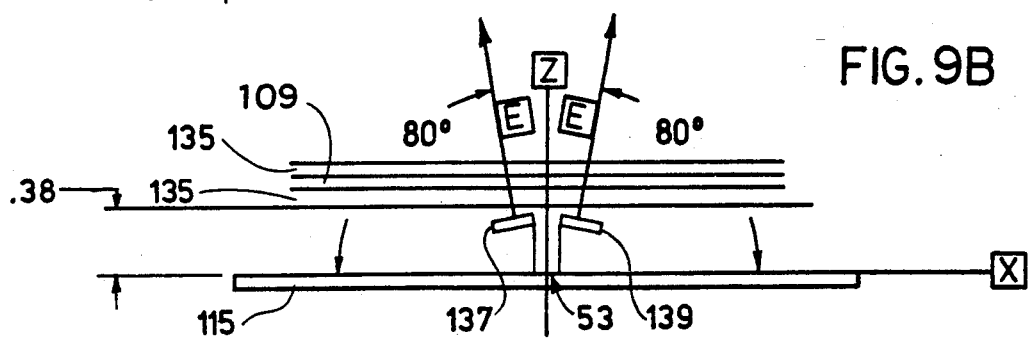

Line E in FIGS. 9A and 9B designate the axis of reception of receivers 137 and 139, the figures illustrating the desired orientation of the receivers relative to door 21. Shielding portion 135 of housing 95 and receivers 137 and 139 are relatively positioned so that incoming signals are partially blocked thereby further defining the effective, truncated detection zone, or footprint, illustrated in FIG. 1A and the detecting area thus seen by the receivers.

A second, and now preferred, embodiment 150 of the housing and mount of this invention is illustrated in FIGS. 10 through 12, having many features similar to the embodiment shown in FIGS. 6 and 7 including housing 95 defining chamber 97 divided into compartments 99 and 101 by divider 103. Bridge 111 is provided as before, as is mounting board 115 having foam barrier 113 positioned adjacent thereto.

Again, Wall portions 117 and 119 of divider 103 are shaped so as to have a loose fit when slid into housing 95 between lenses 152 and 154 and PC board 115. The wall portions are adjacent to opposite outer surfaces of foam barrier 121, which is a low compression set foam (2% or less compression set) such as "Poron" or silicone rubber. As before, wall portions 117 and 119 are held together in place with adjustment screw 123, thereby compressing foam barrier 121 at central parts thereof in such a manner that the outer parts thereof are deformed to fill any voids left by the initially loose fit of divider 103. In this manner, barrier 121 presses directly on PC board 115 on one side, on the two interior vertical surfaces of housing 95, and on isolation bridge 111 at the opposite side. Isolation bridge 111 is designed to optically interrupt the path of any light which is transmitted along the longitudinal axes of emitter lens 152 and detector lens 154 while at the same time offering a smooth mechanical connection between the lenses.

End caps 156 and 158 are attached to housing 95 to contain the entire assembly and to seal housing 95 from stray ambient light. The end caps may include removable plugs 160 so that the various adjustment potentiometers of the detecting apparatus can be easily accessed without having to remove the end caps.

Lenses 152 and 154 are provided to substantially collimate the generally radial output of the emitter diodes 162, 164, 166, and 168 while defining a focal plane (designated as line G) for incoming signals for receivers 170 and 172. By collimating the electromagnetic output radiation, emitters 162 through 168 can be linearly mounted in a substantially perpendicular orientation relative to board portion 174 of PC board 115. This overall arrangement provides an effective detection area concentrated to a region which is approximately rectangular in shape. It is desired that this rectangular footprint start only several inches outward from the plane of the moving door (thus eliminating door movement as a detection trigger to the apparatus without altering the operation of detector circuitry) and extend 10" to 12" outward (when measured 28" from the floor). The length of the footprint is to extend at least 6"

beyond the full opening of the door, when used on sliding doors. When used on swinging doors the footprint should extend several inches beyond the width of the swing door on either side. The presence of the lenses greatly enhances apparatus performance since the infrared energy which is generally dispersed over a large elliptical area which extends up to three feet outward of the door is effectively concentrated near, but effectively spaced from, the moving door.

Phototransistor feedback element 176 is mounted on board portion 174 in such a manner as to receive both direct infrared emission of emitters 162, 164, 166, and 168 (or some of them) as well as some ambient light entering through lens 152. Proper positioning of the phototransistor makes it an effective feedback element (as described hereinafter) to compensate for optical power changes in the emitters as well as ambient light changes. The ideal location of the phototransistor is near the "half power emission field" (defined as the solid angle at which the emission intensity is 50% of its maximum or axial level, and designated in FIG. 12 by cone walls H) of the emitter LEDs, but removed from the focal lines of lens 152 (the focal lines roughly corresponding to H). In this manner the proper ratio of ambient light response and LED response of phototransistor 176 is obtained.

By way of example, where overall housing 95 width is 1.525 inches, arched portion 178 of lenses 152 and 154 has a radius of about 0.50 inch and a width (dimension I, approximately the diameter of the half power field incident thereat) of between 0.50 and 0.60 inch (preferably about 0.542 inch) between planar lens portions 180 and 182. The distance between lens lower surface 184 and point 186 of output from emitters 162 through 168 is approximately 0.75 inch.

To further enhance tuning of the ratio of ambient light to LED emission received by phototransistor 176 and receivers 172 and 174, shields 188 and 190 are attached or coated on planar portions 180 and 182 of lenses 152 and 154 to block, selectively, output and input through the planar portions of the lenses. In particular, an increase of the amount of ambient light on phototransistor 176 could be achieved by providing a small void, or cut-out area 192, of shield 188 directly adjacent to phototransistor 176, void 192 being configured to allow a selected amount of ambient light to enter housing 95 and fall incident on phototransistor 176. This would increase the effect on threshold adjustment, particularly the reduction of threshold sensitivity as the ambient light increases.

Figures 13, 15:
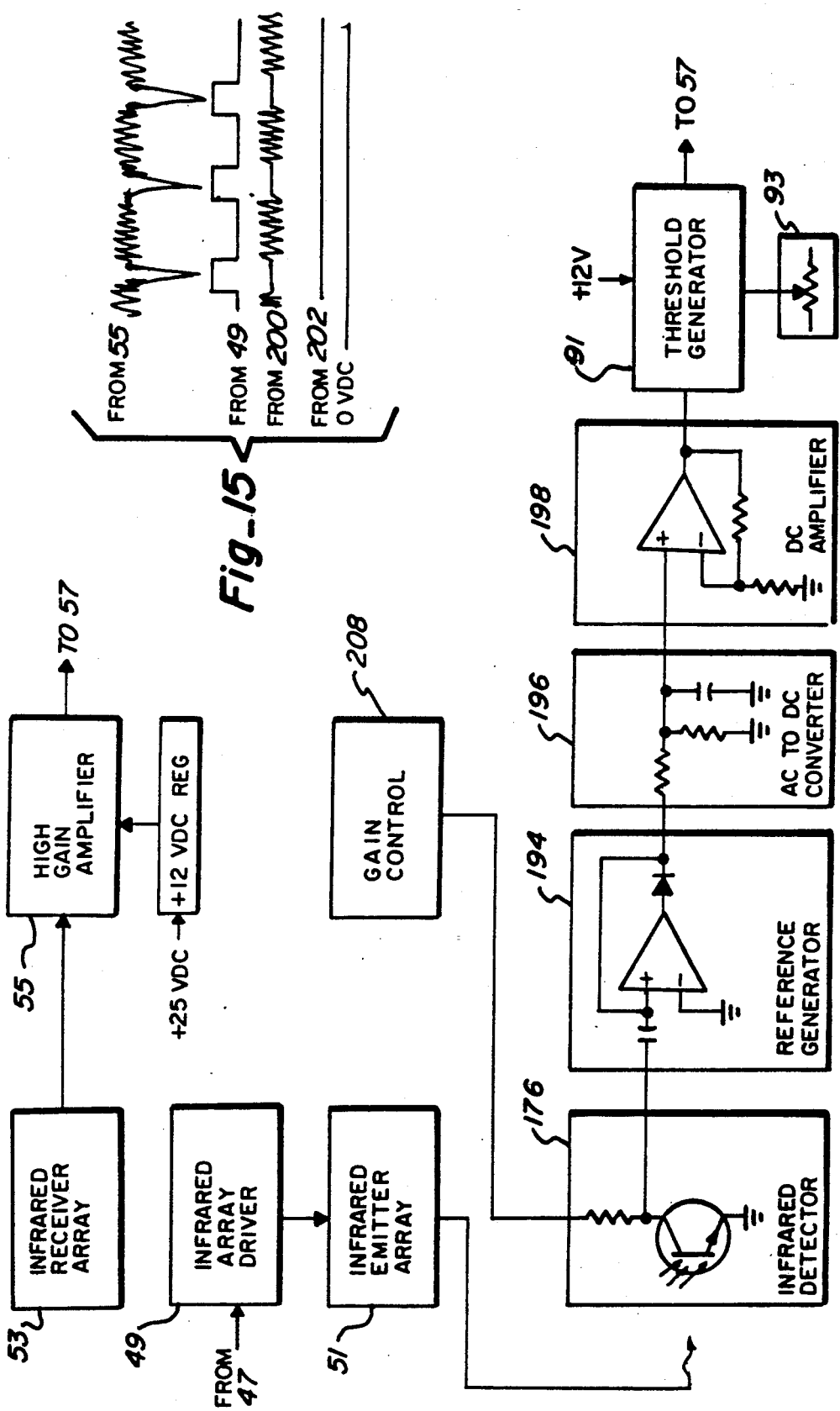
FIG. 13 is a block diagram illustrating a second embodiment of the presence detecting apparatus housed and mounted by this invention.
FIG. 15 is an illustration of the output wave form of the modified background adjustment network of the third embodiment of the apparatus.

FIG. 13 illustrates a second embodiment of the detecting apparatus utilizing feedback element 176 (those portions of the circuit illustrated in FIGS. 3 and 4 which have been changed to accommodate this embodiment only being shown, it being understood that elements before the input and after the output not illustrated in FIG. 13 remain the same).

In order to compensate for variations in the received infrared signal caused by the changes in the ambient light, as well as fluctuations of the optical output of the emitter array that results from ambient temperature variations, the output of phototransistor 176, having a DC component proportional to the ambient light and an AC component proportional to the infrared power of emitters in emitter array 51, is referenced to ground potential by active reference generator circuit 194. The AC component is converted to DC by AC to DC converter 196 (an integrating network). The resulting overall DC potential, which is proportional to ambient light as well as emitter array output power, is then amplified and scaled at DC amplifier 198 before subtraction from manual threshold setting at threshold generator 91. This results in a dynamic threshold network for the heretofore described apparatus capable of adequately compensating for such variations, and totally replaces compensation network 59 (shown in FIG. 3).

A third embodiment of the apparatus is illustrated in FIG. 14, again for compensating for variations in the output of the infrared emitters caused by temperature variations, as well as differences between various batches of emitter diodes, and again utilizing detector 176 in a circuit in place on network 59 of FIG. 3. As before, detector 176 is placed in close proximity to emitter array 51 as set forth herein and its output is referenced to ground by active reference generator circuit 194. The ground referenced pulses with an amplitude proportional to the emitted optical power is then converted to a DC voltage by converter 196 which is also proportional to the optical output of the emitter array. The variable DC potential is scaled by amplifier circuit 198 and is used, after summing, by threshold generator 91 to compensate for the variations in the optical output of emitter array 51.

However, in this embodiment a separate ambient light compensation circuit is also used to automatically adjust the threshold level with the changes in the ambient light. This circuit uses gating network 200 which effectively blocks a portion of the signal received by receiver array 53 (as supplied to gating network 200 from amplifier 55) during the active period of emitter array 51 (taken from driver 49). The remaining noise component is proportional to the ambient light as detected by receiver array 53 and is integrated at integrator 202 to provide a DC voltage proportional to the amount of ambient light. These relationships are logically illustrated in FIG. 15. This DC voltage output is scaled by amplifier circuit 204 and is summed at summing circuit 206 with the output from amplifier 198 for use by threshold generator 91 to make necessary adjustments to the detection threshold level. Both embodiments shown in FIGS. 13 and 14 provide gain control 208 for detector 176 (normally running at between 2 and 3 volts but adjustable thereby in a range of about 0 to 4 volts).

As may be appreciated from the foregoing, an improved housing and mount for presence detecting apparatus is provided which is configured to improve reliability and to reduce false triggers, malfunctions, and the like of the presence detecting apparatus.

What is claimed is:

1. A housing apparatus for a presence detector, the presence detector including emitter means and receiver means to emit and detect, respectively, selected electromagnetic radiation, said housing apparatus comprising:
   mounting means in part defining a chamber for mounting the presence detector therein;
   filtering means mountable at one part of said mounting means for filtering the electromagnetic radiation, said filtering means including first and second portions;
   isolation means mountable between the emitter means and receiver means in said mounting means for dividing said chamber into first and second compartments, said isolation means including a compressible barrier portion and an adjustable compressing portion having first and second sections, a first part of said barrier portion being compressible between said sections so that a second part deforms to substantially seal said first compartment from said second compartment of said chamber against passage of the selected electromagnetic radiation therebetween; and bridging means mountable at said one part of said mounting means and made of material which is substantially opaque to the selected electromagnetic radiation, said bridging means for engaging said first and second portions of said filtering means and said isolation means.

2. The apparatus of claim 1 wherein said mounting means includes shielding means for at least partially shielding one of said emitter means and said receiver means so that a detection area characterized by a selected footprint configuration is provided.

3. The housing apparatus of claim 1 wherein said adjustable compressing portion of said isolation means includes connecting means for connecting said first and second sections at different sides of said first part of said barrier portion.

4. The housing apparatus of claim 1 wherein said barrier portion is constructed of a foam material, wherein said first and second sections of said compressing portion each have a cross section smaller than a cross section of said chamber, and wherein said apparatus further comprises a circuit mount mounted in said mounting means below said isolation means and a second foam barrier portion mounted below said circuit mount.

5. The apparatus of claim 4 wherein said presence detector further includes a feedback element, said emitter means including a plurality of emitters with emitter operation defining a half power emitter field in said chamber, said circuit mount having a portion for substantially linearly mounting said emitters relative to one another and for mounting said feedback element relative to said emitters and said filtering means so that said element is adjacent to said half power emitter field and receives ambient light through said filtering means.

6. The apparatus of claim 1 wherein said selected electromagnetic radiation is infrared radiation and wherein said filtering means are acrylic infrared filters, said bridging means overlapping an end section of each of said first and second portions of said filtering means.

7. A chamber divider for dividing a substantially enclosed chamber having chamber walls into first and second compartments, at least one of said compartments for housing a component capable of emitting selected electromagnetic radiation, said divider comprising:

a deformable barrier; and compressing means for compressing a first part of said deformable barrier so that a second part of said barrier is urged toward the chamber walls thus dividing the chamber and substantially sealing the compartments at the chamber walls from passage therebetween of the selected electromagnetic radiation.

8. The chamber divider of claim 7 wherein said chamber walls include first and second adjacent means for admitting passage of the electromagnetic radiation therethrough, said divider further comprising bridging means substantially impervious to passage therethrough of the selected electromagnetic radiation for engagement between said first and second means for admitting passage of the electromagnetic radiation.

9. The chamber divider of claim 8 wherein said bridging means and said deformable barrier are positioned relative to one another at the chamber so that said second part of said barrier is urged toward and into contact with said bridging means.

10. The chamber divider of claim 7 wherein said compressing means includes first and second wall portions each having a surface area smaller than a surface area of said deformable barrier into contact with which said wall portions are positionable.

11. The chamber divider of claim 10 wherein the chamber has a cross sectional area and wherein said surface area of each of said wall portions is smaller than the cross sectional area of the chamber.

12. The chamber divider of claim 7 wherein said compressing means includes adjusting means for exerting and adjusting compression of said first part of said deformable barrier.

13. A housing and component mount for a presence detector, the presence detector including control circuitry and emitter means and detector means for emitting and detecting, respectively, selected electromagnetic radiation, said housing and component mount comprising:

mounting means in part defining a chamber for mounting the control circuitry, emitter means and detector means therein, said mounting means having an opening from said chamber and directing means at said opening from said chamber for preselected direction of electromagnetic radiation emitted by the emitter means, said opening being spaced from the emitter means and detector means, said mounting means including a board defining a wall of said chamber for mounting the emitter means thereon at a selected distance from said directing means and having a feedback element of the presence detector mounted thereon at a position relative to said directing means and the emitter means so that said element receives both direct electromagnetic radiation from the emitter means and ambient light through said directing means; and divider means for dividing said chamber of said mounting means into first and second compartments having different ones of the emitter means and detector means therein.

14. The housing and mount of claim 13 wherein said directing means is a lens having a focal length.

15. The housing and mount of claim 14 wherein said mounting means includes a board defining a wall of said chamber for mounting said emitter means and detector means thereon at a distance from said lens approximating said focal length.

16. The housing and mount of claim 13 wherein said directing means includes a collimating lens for collimating the electromagnetic radiation emitted by the emitter means.

17. The housing and mount of claim 13 wherein the emitter means of the presence detector includes a plurality of emitters with emitter operation defining a half power emitter field in said chamber, and wherein said directing means includes a collimating lens portion having a width substantially approximating a dimension of said half power field thereat and a substantially planar portion.

18. The housing and mount of claim 17 wherein said substantially planar portion includes shielding means thereat for shielding a selected part thereof against passage of either one of the selected electromagnetic radiation and ambient light from outside the housing.

19. The housing and mount of claim 18 wherein said shielding means includes a selectively configured void adjacent to said detector element having a size selected to increase by a desired amount ambient light received by the feedback element.

* * * * *